United States Patent [19]

Giles et al.

[11] Patent Number: 5,607,754

[45] Date of Patent: Mar. 4, 1997

[54] PAPER WEB PRODUCT AND METHOD FOR MANUFACTURING SAME

[75] Inventors: Frank H. Giles, West Chester, Pa.; Claire King, Atco; Ho-Ward J. Yoh, Medford, both of N.J.

[73] Assignee: Kimberly-Clark Corporation, Neenah, Wis.

[21] Appl. No.: 458,018

[22] Filed: Jun. 1, 1995

Related U.S. Application Data

[63] Continuation of Ser. No. 151,437, Nov. 12, 1993, abandoned.

[51] Int. Cl.⁶ ..................................................... B32B 9/00
[52] U.S. Cl. ......................... 428/211; 428/68; 428/124; 428/125; 428/126; 428/134; 428/137; 428/321.5; 428/130
[58] Field of Search ................................. 428/124, 126, 428/68, 130, 134, 321.5, 905, 43, 125, 137, 211

[56] References Cited

U.S. PATENT DOCUMENTS

| | | | |
|---|---|---|---|
| 2,933,431 | 3/1957 | Sperouleas | 167/84 |
| 2,999,642 | 9/1961 | Stone | 235/52 |
| 3,137,631 | 6/1964 | Soloway | 167/83 |
| 3,516,846 | 6/1970 | Matson | 117/36.2 |
| 3,565,753 | 2/1971 | Yurkowitz | 162/127 |
| 3,623,659 | 11/1971 | Maierson et al. | 239/56 |
| 4,624,890 | 11/1986 | Lloyd et al. | 428/290 |
| 4,745,640 | 5/1988 | Nelson | 4/243 |
| 4,746,567 | 6/1988 | Zelter | 428/321.5 |
| 4,769,264 | 9/1988 | Dreger | 428/40 |
| 4,908,252 | 3/1990 | Carnahan et al. | 428/27 |
| 4,917,920 | 4/1990 | Ono et al. | 427/389 |
| 5,118,554 | 6/1992 | Chan et al. | 428/126 |

FOREIGN PATENT DOCUMENTS

| | | |
|---|---|---|
| 62-142530 | 6/1987 | Japan. |
| 1401143 | 7/1975 | United Kingdom. |

*Primary Examiner*—Patrick Ryan
*Assistant Examiner*—Abraham Bahta
*Attorney, Agent, or Firm*—Karl V. Sidor

[57] ABSTRACT

A stack of paper web products such as tissues, towels, napkins, hankies, wet wipes, and the like, and a method for making same wherein a plurality of sheets of the paper web product are stacked one on top of the other with each of the folded sheets having a fold configuration that creates a substantially rectangular footprint having four edges. Each sheet in the stack has at least one folded edge. After formation of the stack, micro encapsulated chemicals such as essential oils are applied to the side of the stack such that the essential oil containing microcapsules become adhered to the individual sheets along the folds. This stack of sheets are then packaged thereby minimizing the amount of handling and manipulation of the stack and the individual sheets after the microcapsules have been applied thereto. The microcapsules on an individual sheet are caused to rupture by the extraction of individual sheets from the package and through normal use of the paper web product. Rupture of the capsules exposes the essential oils within the microcapsules to be exposed to the atmosphere thereby delivering a pleasing scent or a decongesting effect or both to the user of the tissue.

23 Claims, 1 Drawing Sheet

PAPER WEB PRODUCT AND METHOD FOR MANUFACTURING SAME

This is a continuation of application Ser. No. 08/151,437, filed Nov. 12, 1993, now abandoned.

BACKGROUND OF THE INVENTION

1. Field of the Invention

This invention relates generally to paper web products such as facial tissue, towels, napkins, hankies, wet wipes, and the like, and more particularly, to such paper web products containing microencapsulated chemicals such as essential oils and/or decongestants.

2. Brief Description of the Prior Art

U.S. Pat. No. 4,746,567 to Zelter teaches a paper product restoring fragrances. The paper product includes microcapsules containing the fragrance and microcapsules containing a neutral fluid. The microcapsules are embedded in a paper support structure. The microcapsules containing the neutral fluid are larger in diameter than the microcapsules containing the fragrance such that they protect the fragrance containing microcapsules from crushing during manufacture of the paper support. Rubbing the paper support will serve to crush the microcapsules containing the fragrance thereby releasing the fragrance.

U.S. Pat. No. 4,908,252 to Carnahan, et al. teaches a fragrance sample product containing microcapsules. The microcapsules are embedded in a sheet of synthetic pile fabric or other fabric with similar tactile properties. The microcapsules are ruptured by rubbing thereby releasing the sample fragrance.

U.S. Pat. No. 4,624,890 to Lloyd, et al. discloses a wiping cloth, such as paper, carrying a liquid cleaning composition in pressure-rupturable microcapsules. The microcapsules may be located in, on, or between one or more sublayers.

U.S. Pat. No. 3,137,631 to Soloway discusses the encapsulation of volatile compounds including perfumes and certain types of medication. A suspension of the encapsulated compounds may be applied to the surface of paper or other nonwoven or woven fibrous materials.

The prior art generally requires that the micro encapsulated materials be applied overall to the surface of the fabric or paper, or be embedded or formed within the support structure or paper web. Typically, this requires large amounts of micro encapsulated compounds to completely disperse through or cover the surface of the carrier web. Further, care must be taken in the converting, handling or other manipulation of the web after formation to ensure that the microcapsules are not prematurely ruptured by such handling.

SUMMARY OF THE INVENTION

It is therefore an object of the present invention to provide a paper web product having micro encapsulated chemicals such as essential oils applied to discrete locations such that overall application of the micro encapsulated chemicals is unnecessary.

It is a further object of the present invention to provide a paper web product having micro encapsulated essential oils applied thereto where the application of the micro encapsulated essential oil is performed after the web has been converted such that there is minimal handling and manipulation of the web after the application of the microcapsules.

Another object of the present invention is to provide a paper web product containing micro encapsulated essential oils wherein normal extraction and use of the tissue product will cause the microcapsules to rupture.

Briefly stated, the foregoing and numerous other objects, features and advantages of the present invention will become readily apparent upon reading the detailed description, claims and drawings set forth herein. These objects, features and advantages are accomplished by first folding and stacking a plurality of sheets of paper web, tissue for example, wherein each of the folded sheets of tissue has a fold configuration that creates a substantially rectangular footprint having four edges and wherein at least one of the edges is a folded edge, and then applying micro encapsulated essential oils to the folded edges of the sheet of tissue in the stack. The microcapsules can be applied in dry form through brushing or dry spray, or can be applied to the tissue in wet form through brushing, printing or spraying in a slurry containing binder and/or a filler. By applying the microcapsules after the stack has been formed, handling of the product having the micro encapsulated material incorporated therein is minimized. Such handling can cause premature rupture of the microcapsules and release of the chemicals contained therein. The encapsulation prevents the essential oils from evaporation until the time of use and, although a small area of each sheet is treated, the user will perceive the product as having an overall treatment. By locating the microcapsules at or along the fold line, the capsules will be caused to rupture by mere extraction of a sheet from a tissue box and through normal use of the tissue.

DETAILED DESCRIPTION OF THE PREFERRED EMBODIMENT

Figure 1:
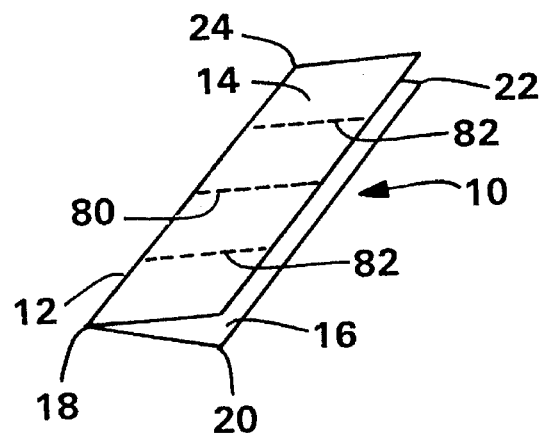
FIG. 1 is a perspective view of a sheet of tissue in a B-fold configuration.
Figure 2:
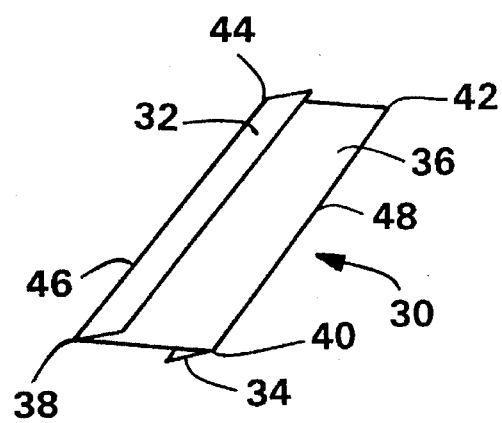
FIG. 2 is a perspective view of a sheet of tissue in a Z-fold configuration.

Turning first to FIG. 1, there is shown a sheet 10 of paper web such as tissue having a fold 12 which substantially folds sheet 10 in half with overlapping flaps 14, 16. Lower flap 16 may be identified by its corners 18, 20, 22, and 24 forming a rectangle. That rectangle becomes the footprint for a stack of tissues 10 stacked vertically one upon the other. Of course, with the V-fold configuration of the tissue 10 depicted in FIG. 1, the tissues may be stacked in interleaved or non-interleaved fashion. FIG. 2 depicts a sheet of tissue 30 folded in a conventional Z-fold. Tissue 30 includes an upper flap 32, a lower flap 34, and an intermediate flap 36. Since intermediate flap 36 is larger than upper flap 32 and lower flap 34, the corners 38, 40, 42, and 44 of intermediate flap 34 define the footprint for towel 30.

Figure 3:
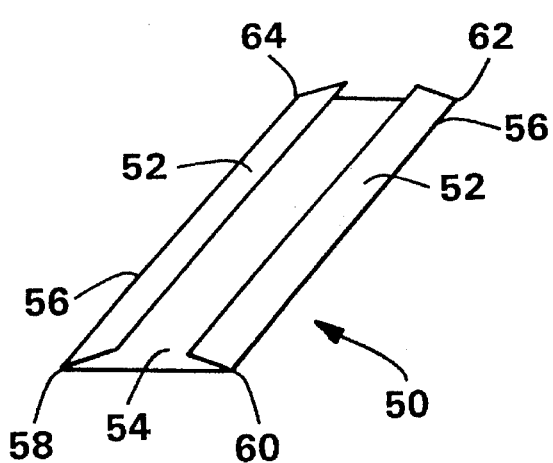
FIG. 3 is a perspective view of a sheet of tissue in a C-fold configuration.

FIG. 3 shows a sheet of facial tissue 50 folded in a conventional C-fold configuration. Tissue 50 includes two minor flaps 52 with a major flap 54 there between. Minor flaps 52 are separated from major flap 54 by folds of 56. Thus, major flap 54 may be defined by its four corners 58, 60, 62, and 64 which form a rectangle which becomes the footprint for a stack of towels 50.

Figure 4:
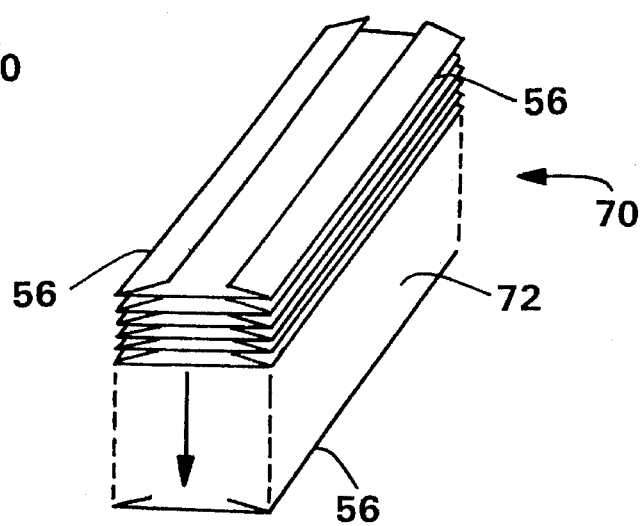
FIG. 4 is a perspective view of a stack of tissues in a C-fold configuration.

Looking next at FIG. 4, there is shown a stack 70 of folded sheets of tissue 50. Although FIG. 4 shows the use of only a C-fold configuration, it is apparent to those skilled in the art that the fold configurations for tissue depicted in FIGS. 1 and 2 as well as any of the other well known fold configurations for facial tissue known to those skilled in the art may be used to form a stack of tissue. Such stacks of tissue may be in interleaved configurations or non-interleaved configurations. Further, although each sheet of tissue 10, 30, 50 depicted in FIGS. 1 through 3 are shown as being single ply, this is merely representational. It is typical that facial tissue is made from multi-ply or laminated construction.

Varying methods in apparatus are known to convert base tissue web into the facial tissue fold configurations depicted in FIGS. 1 through 3 as well as other fold configurations known to those skilled in the art. Further, various methods and apparatus are known to stack such folded sheets of tissue to form a stack 70 of tissue.

Regardless of the fold configuration used to create a stack 70 of tissue, such a stack 70 will have at least one lateral side 72 comprised of super-posed folded edges. The stack 70 depicted in FIG. 4 has two lateral side edges 72 of superposed folds 56.

Although the description of FIGS. 1 through 4 above refer to sheets 10, 30, 50 predominantly as tissue, this is intended to be exemplary only. It will be recognized by those skilled in the art that the sheets 10, 30, 50 may also be towels, napkins, hankies, wet wipes, etc. without departing from the scope of the invention. The stack 70 includes any of such products as folded in their final fold configuration prior to packaging. In the case of hankies any of the fold configurations depicted in FIG. 1, 2 and 3 may be used, among others. Hankies are, however, typically quarter-folded after the original fold configuration is imparted thereto and prior to final packaging. For example, referring back to FIG. 1, for a hankie the folded sheet 10 would be folded in half along dotted line 80, and then folded in half again along dotted lines 82. Dotted lines 82 will, of course, be superposed after the fold along dotted line 80 is made. A stack 70 of hankies would have the microcapsules applied thereto after being quarter-folded.

After the stack 70 has been formed and prior to packaging of the stack, microcapsules are applied to at least one of the lateral edges 72 of the stack such that the folded edges 56 have attached thereto microcapsules containing the chemical. Preferably, the chemical contained within microcapsules is an essential oil having a high volatility. It can be those essential oils that have therapeutic effects such as a mixture of menthol, eucalyptus oil, and camphor which is known for its decongesting effect, or those that just provide pleasant scents. Other essential oils that may be microencapsulated and used with the present invention include anise, arnica, basil, benzoin, bergamot, calendula, canaga, celery seed oil, chamomile, cinnamon, cypress, fir, fennel, frankincense, geranium, hyssop, juniper, lavender, myrrh orange blossom, patchouli, peppermint, pine, rosehips, rosemary, sage, sandalwood, spruce, tea tree oil, vallerian root, violet leaf, and ylang-ylang. Such essential oils have varying real or perceived effects, either through inhalation or topical application. Such effects include acting as a relaxant, a stimulant, a healing agent for cuts and scratches, a cleansing agent, an emollient, an antiseptic, an astringent, an anti-inflammatory, an analgesic, etc. Volatile chemical substances other than essential oils can be used in the practice of the present invention. One example would be the application of microencapsulated pheromones to the lateral side 72 of a stack 70.

Although microcapsules are specifically stated as the encapsulation system herein, any encapsulation system or micro polymeric particles (synthetic or natural) than can hold in essential oils to prolong the shelf life of the volatile material can be used as a carrier for the purposes of this invention. Thus, the terms "microcapsules" and "microencapsulated" as used herein should be interpreted herein to include microcapsules, microsponges, and polytraps, as well as any other microparticles, natural or synthetic, that can be used to absorb or adsorb volatile chemicals and that will release such volatile chemicals upon rupture or physical manipulation.

Those micro particles or microcapsules containing essential oils can be applied to the stack 70 in dry form through brushing or dry spray. Further, they can be applied to a stack 70 in wet form through brushing, printing, or spraying in an aqueous or non-aqueous slurry containing binder and/or filler. Preferably, the microcapsules containing essential oils are applied in an aqueous slurry with a water soluble latex. Application is to the side 72 of the stack 70 comprising folded edges 12, 46, or 56 shortly before the stack 70 is wrapped or packaged. This minimizes manipulation of the stack 70 and the individual sheets of tissue 10, 30, or 50 after the microcapsules have been applied thereby minimizing potential premature rupture of such microcapsules.

Preferably, microcapsules should be applied such that each individual sheet contains in the range of 0.0001 to 0.1 grams of microcapsules. Further, the amount of essential oil contained in each microcapsule can be varied by using a diluent such as mineral oil.

Although microcapsules are applied only to the side 72 of the stack 70 comprising folded edges 12, 46, or 56, a portion of such microcapsules can ultimately reside on the sheets away from the folded edges 12, 46, or 56, albeit in relatively close proximity thereto. This can be accomplished by varying the volumetric ratio of microcapsules to carrier liquid forming the slurry. The more carrier liquid used, the more such carrier liquid will be caused to migrate through the sheets through capillary action. The migrating carrier liquid will carry with it a portion of the microcapsules.

With regard to the use of the term "paper web" as used herein to describe sheets 10, 30, 50, such term includes any web containing cellulosic fibers alone or in combination with other fibers, natural or synthetic, wherein the sheet 10, 30, 50 generally is intended for a single use, after which, it is discarded.

From the foregoing, it should be appreciated that this invention is one well adapted to attain all of the ends and objects hereinabove set forth together with other advantages which are apparent and which are inherent to the product and method.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matters herein set forth or shown in the accompanying drawings are to be interpreted as illustrative and not in a limiting sense.

What is claimed is:

1. A stack of paper web products comprising:

(a) a plurality of paper web sheets stacked one on top of another, each of said sheets having a fold configuration that creates a substantially rectangular footprint having four edges wherein at least one of said edges is a folded edge;

(b) a plurality of microcapsules containing a volatile chemical located substantially only along said folded edges, said microcapsules having been applied to said folded edges after said plurality of paper web sheets have been formed into said stack.

2. A stack of paper web products as recited in claim 1 wherein:

said volatile chemical is an essential oil.

3. A stack of paper web products as recited in claim 1 wherein:

said paper web sheets are facial tissues.

4. A stack of paper web products as recited in claim 1 wherein:

said paper web sheets are towels.

5. A stack of paper web products as recited in claim 1 wherein:

said paper web sheets are hankies.

6. A stack of paper web products as recited in claim 1 wherein:

said paper web sheets are napkins.

7. A stack of paper web products as recited in claim 1 wherein:

said paper web sheets are wet wipes.

8. A stack of paper web products as recited in claim 1 wherein:

said volatile chemical is a pheromone.

9. A stack of paper web products comprising:

(a) a plurality of paper web sheets stacked one on top of another, each of said sheets having a fold configuration that creates a substantially rectangular footprint having four edges wherein at least one of said edges is a folded edge;

(b) a plurality of microcapsules containing a volatile chemical located substantially only along and proximate to said folded edges.

10. A method of making a paper web product containing microcapsules of a volatile chemical comprising the steps of:

(a) folding a plurality sheets of paper web have a fold configuration that creates a substantially rectangular footprint having four edges wherein at least one of said edges is a folded edge;

(b) superposing a plurality of the folded sheets vertically one upon another such that a stack is created;

(c) applying a microencapsulated volatile chemical to a lateral side of the stack.

11. A method of making a paper web product containing microcapsules of a volatile chemical as recited in claim 10 wherein:

the lateral side to which the microencapsulated volatile chemical is applied is comprised of a plurality of the folded edges.

12. A method of making a paper web product containing microcapsules of a volatile chemical comprising the steps of:

(a) folding a plurality sheets of paper web have a fold configuration that creates a substantially rectangular footprint having four edges wherein at least one of said edges is a folded edge;

(b) superposing a plurality of the folded sheets vertically one upon another such that a stack is created wherein the stack has a lateral side comprised of a plurality of superposed folded edges;

(c) applying a microencapsulated volatile chemical to the lateral side of the stack comprised of the superposed folded edges.

13. A method of making a paper web product containing microcapsules of a volatile chemical as recited in claim 10 wherein:

said volatile chemical is an essential oil.

14. A method of making a paper web product containing microcapsules of a volatile chemical as recited in claim 10 wherein:

said paper web sheets are facial tissues.

15. A method of making a paper web product containing microcapsules of a volatile chemical as recited in claim 10 wherein:

said paper web sheets are towels.

16. A method of making a paper web product containing microcapsules of a volatile chemical as recited in claim 10 wherein:

said paper web sheets are hankies.

17. A method of making a paper web product containing microcapsules of a volatile chemical as recited in claim 10 wherein:

said paper web sheets are napkins.

18. A method of making a paper web product containing microcapsules of a volatile chemical as recited in claim 10 wherein:

said paper web sheets are wet wipes.

19. A method of making a paper web product containing microcapsules of a volatile chemical as recited in claim 10 wherein:

said volatile chemical is a pheromone.

20. A method of making a paper web product containing microcapsules of a volatile chemical as recited in claim 12 wherein:

said volatile chemical is an essential oil.

21. A stack of folded sheets of tissue comprising:

(a) a plurality of folded sheets of tissue stacked one on top of another, each of said sheets having a fold configuration that creates a substantially rectangular footprint having four edges wherein at least one of said edges is a folded edge; and (b) a plurality of microcapsules containing a volatile chemical located substantially only along said folded edge.

22. A stack of folded sheets of tissue as recited in claim 21 wherein said sheets of tissue are interleaved.

23. A stack of folded sheets of tissue as recited in claim 21 wherein said sheets of tissue are multi-ply sheets of tissue.

* * * * *